United States Patent
Shi et al.

(10) Patent No.: US 10,504,530 B2
(45) Date of Patent: Dec. 10, 2019

(54) SWITCHING BETWEEN TRANSFORMS

(71) Applicant: Dolby Laboratories Licensing Corporation, San Francisco, CA (US)

(72) Inventors: Dong Shi, Shanghai (CN); Xuejing Sun, Beijing (CN); Glenn N. Dickins, Como (AU); David Gunawan, Sydney (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 364 days.

(21) Appl. No.: 15/277,027

(22) Filed: Sep. 27, 2016

(65) Prior Publication Data

US 2017/0127089 A1 May 4, 2017

Related U.S. Application Data

(60) Provisional application No. 62/249,993, filed on Nov. 3, 2015.

(51) Int. Cl.
*H04N 19/86* (2014.01)
*G10L 19/02* (2013.01)
(Continued)

(52) U.S. Cl.
CPC ......... *G10L 19/0212* (2013.01); *H04N 19/12* (2014.11); *H04N 19/136* (2014.11); *H04N 19/179* (2014.11)

(58) Field of Classification Search
CPC .............................. H04N 19/86; H04N 19/136
See application file for complete search history.

(56) References Cited

U.S. PATENT DOCUMENTS 5,852,806 A 12/1998 Johnston
6,115,689 A 9/2000 Malvar
(Continued)

OTHER PUBLICATIONS

Malvar, Henrique "Modulated Complex Lapped Transform and its Applications to Audio Processing" IEEE International Conference on Acoustics, Speech and Signal Processing, Mar. 1999, pp. 1421-1424.

(Continued)

*Primary Examiner* — William C Vaughn, Jr.
*Assistant Examiner* — Jerry T Jean Baptiste

(57) ABSTRACT

A method of processing data comprises processing first frequency-domain audio or video data using signal processing of a first type, and transforming the processed first frequency-domain audio or video data to processed time-domain audio or video data using a transform which is the inverse of the first transform, and transforming the processed time-domain audio or video data using a second transform which is matched to a second type of signal processing. The method further comprises identifying time-domain audio or video data for which signal processing of the first type, after transformation using the second transform, would yield satisfactory results. The method further comprises transforming the identified time-domain audio or video data to frequency-domain identified audio or video data using the second transform, instead of using the first transform, and processing the identified frequency-domain audio or video data using signal processing of the first type.

36 Claims, 7 Drawing Sheets

(51) Int. Cl.
*H04N 19/12* (2014.01)
*H04N 19/136* (2014.01)
*H04N 19/179* (2014.01)

(56) References Cited

U.S. PATENT DOCUMENTS

| | | | |
|---|---|---|---|
| 6,487,574 | B1 | 11/2002 | Malvar |
| 7,225,123 | B2 | 5/2007 | Ha |
| 7,516,064 | B2 | 4/2009 | Vinton |
| 7,546,240 | B2 | 6/2009 | Mehrotra |
| 7,630,902 | B2 | 12/2009 | You |
| 8,095,359 | B2 | 1/2012 | Boehm |
| 8,606,586 | B2 | 12/2013 | Nagel |
| 8,694,326 | B2 | 4/2014 | Miyasaka |
| 2008/0140428 | A1 | 6/2008 | Choo |
| 2008/0225940 | A1* | 9/2008 | Ma .......................... H04N 5/76 375/240.01 |
| 2008/0312912 | A1* | 12/2008 | Choo ................... G10L 19/008 704/203 |
| 2009/0319278 | A1 | 12/2009 | Yoon |
| 2011/0087494 | A1 | 4/2011 | Kim |
| 2012/0022881 | A1* | 1/2012 | Geiger ................. G10L 19/022 704/504 |
| 2012/0243692 | A1 | 9/2012 | Ramamoorthy |
| 2013/0064383 | A1 | 3/2013 | Schnell |
| 2014/0058737 | A1 | 2/2014 | Ishikawa |
| 2014/0074489 | A1 | 3/2014 | Chong |

OTHER PUBLICATIONS

Malvar, Henrique "Fast Algorithm for the Modulated Complex Lapped Transform" IEEE Signal Processing Letters, vol. 10, No. 1, Jan. 2003, pp. 8-10.

Princen, J. et al "Subband/Transform Coding Using Filter Bank Designs Based on time Domain Aliasing Cancellation" IEEE International Conference on Acoustics, Speech, and Signal Processing, vol. 12, 1987, pp. 2161-2164.

Lin, X. et al "Frequency-Domain Adaptive Algorithm for Network Echo Cancellation in VoIP" EURASIP Journal on Audio, Speech, and Music Processing—Intelligent Audio, Speech, and Music Processing Applications, vol. 2008, Jan. 2008, pp. 1-9.

Stokes, J. W. et al "Acoustic Echo Cancellation with Arbitrary Playback Sampling Rate" IEEE International Conference on Acoustics, Speech, and Signal Processing, vol. 4, May 17-21, 2004, pp. 1-4.

Benesty J. et al "Noise Reduction Algorithms in a Generalized Transform Domain" IEEE Transactions on Audio, Speech and Language Processing, New York, NY, USA, vol. 17, No. 6, Aug. 1, 2009, pp. 1109-1123.

Farhang-Boroujeny B et al "Selection of Orthonormal Transforms for Improving the Performance of the Transform Domain Normalised LMS Algorithm" IEE Proceedings—F, vol. 139, No. 5, Oct. 1992, pp. 327-335.

Mergu, R. R. et al "Investigation of Transform Dependency in Speech Enhancement" International Journal of Recent Technology and Engineering (IJRTE) vol. 2, Issue 3, Jul. 2013, pp. 124-128.

Li, J. et al "Block Transforms for Cancellation of Acoustic Echoes" IEEE Proc. of the Asilomar Conference, Pacific Grove, Nov. 1-3, 1993, vol. 2 of 02, pp. 1310-1314.

Sharma, R. et al "Enhancement of Speech Signal by Adaptation of Scales and Thresholds of Bionic Wavelet Transform Coefficients" International Journal of Advanced Research in Electrical, Electronics and Instrumentation Engineering, on International Conference on Signal Processing, Embedded System and Communication Technologies and their Applications for Sustainable and Renewable Energy (ICSECSRE '14), vol. 3, Special Issue 3, Apr. 2014, pp. 2320-3765.

Benesty, J. et al "Adaptive Signal Processing—Applications to Real-World Problems" Signals and Communication Technology, Springer, 2003.

Benesty J. et al Noise Reduction in Speech Processing, Springer-Verlag, Berlin, Germany, 2009.

Spanias, A. et al "Audio Signal Processing and Coding" Hoboken, NJ, John Wiley & Sons, pp. 464, 2006.

* cited by examiner

```
function Determine_Path
(
Acceptable Latency, -- a parameter which represents how much latency the system can
currently tolerate Available Cycles, -- a parameter which represents how much more load the processor can
currently handle Required Signal Processing, -- a parameter which represents an estimated extent of processing
required for a current frame of the audio or video data Data Classification, -- a parameter which represents a classification of a current frame of the
audio or video data, e.g. speech signal, and noise signal or a music signal
)
        Set Path to: Upper_Path
        if Acceptable Latency < Latency Threshold then
        -- Using Upper Path would exceed a currently-acceptable latency, as defined by
        Acceptable Latency, and so the lower path is preferred
                Set Path to: Lower_Path
                return (Path)
        end
        if Available Cycles < Cycles Threshold then
        -- The available processing power is insufficient for the computational burden
        associated with the upper path, and so the lower path is preferred
                Set Path to: Lower_Path
                return (Path)
        end
        if Required Signal Processing < Signal Processing Threshold
        -- This means only "light" signal processing is required, and so the lower path is
        preferred
                Set Path to: Lower_Path
                return (Path)
        end
        if Data Classification = "Noise"
        -- this means the current frame of audio or video data represents a noise signal,
        which will anyway be suppressed to very low levels, and so the lower path is preferred
        (since the introduction of artifacts is therefore not an issue)
                Set Path to: Lower_Path
                return (Path)
        end
        return (Path)
end
```

*FIG. 4C* ced # SWITCHING BETWEEN TRANSFORMS

TECHNOLOGY

The present disclosure relates generally to processing of audio or video data, and to transformation of the audio or video data from one domain to another in order to facilitate the processing, particularly to switching between transforms to be used in the transformation.

BACKGROUND

It is common for audio or video data to be transformed from one domain to another in order to facilitate desired signal processing. For example, pulse code modulated (PCM) audio data generated by a transducer such as a microphone may be transformed from a time domain to a frequency domain, in order for it to be compressed.

Typically, transformation of audio or video data from one domain to another is done using a transform selected due to its suitability for the type of signal processing at hand. For example, if it is compression that is to be performed on audio or video data, the modified discrete cosine transform (MDCT) may be used to transform the audio or video data into a frequency domain; the MDCT's suitability for compression is well known.

It is not uncommon for audio or video data to sequentially undergo two or more different types of signal processing. For example, PCM audio data generated by a transducer such as a microphone may be processed to reduce noise (first signal processing) before being compressed (second signal processing). Typically, the different types of signal processing would involve respective different transforms.

BRIEF DESCRIPTION OF DRAWINGS

FIG. 4C shows example pseudo code of an algorithm performed by the monitor-and-control module shown in FIG. 4A, in step S405 shown in FIG. 4B FIG. 5 schematically shows a computer system capable of implementing the example processing architectures of FIGS. 2A, 2B, 2C, 3A and 3B and the monitor-and-control module of FIG. 4, in accordance with embodiments of the present disclosure.

DESCRIPTION OF EXAMPLE EMBODIMENTS

Figure 1:
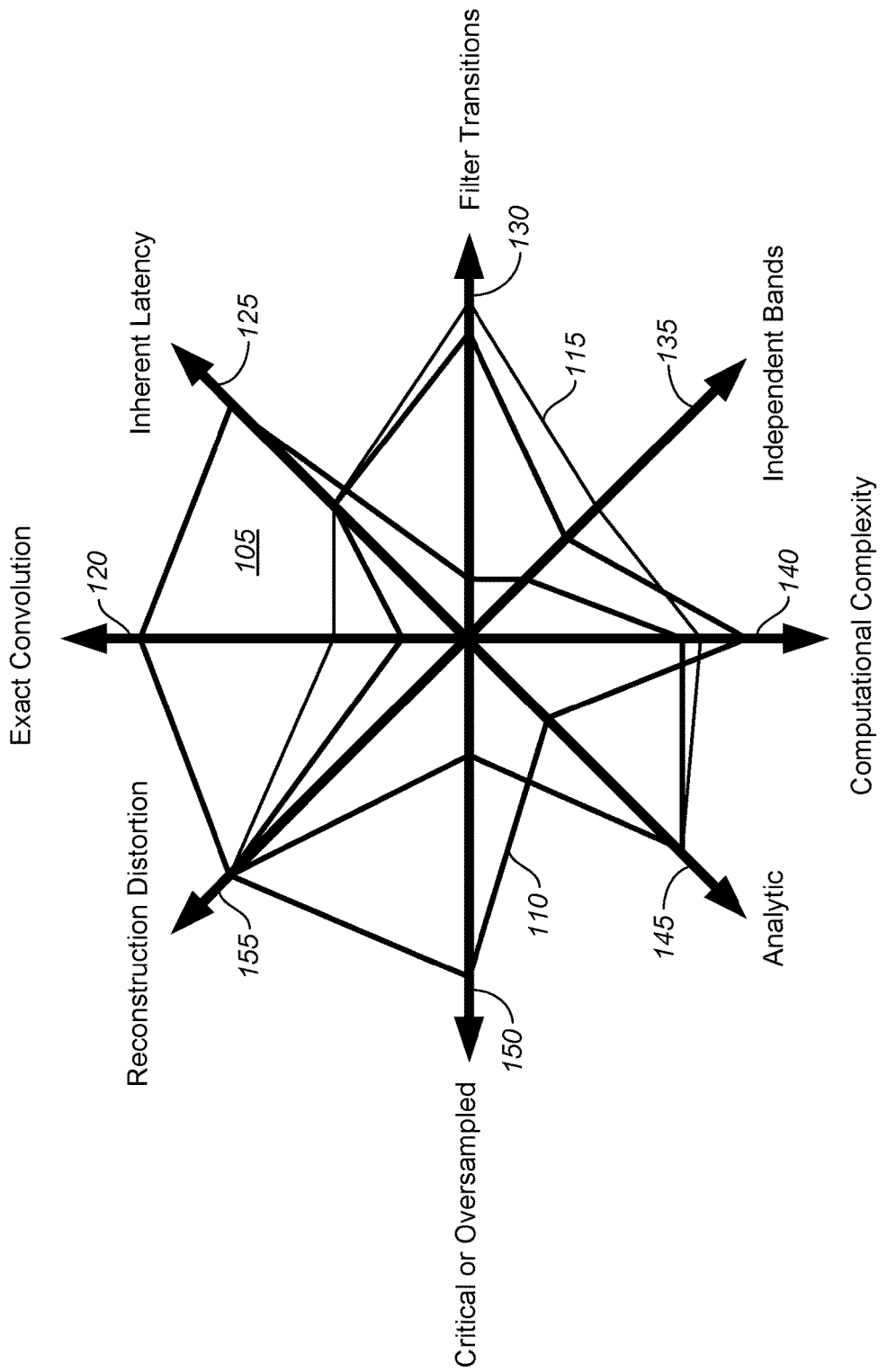
FIG. 1 is a radar chart which schematically illustrates the respective performances of three different transforms according to eight different performance attributes.

Example embodiments, which relate to selecting, at run-time, a transform from two or more available transforms, are described herein. In the following description, for the purposes of explanation, some specific details are described in order to provide an understanding of the present invention; it will be apparent, however, that the present invention may be practiced without these specific details. Also, well-known structures, devices and techniques are not described at length, in order to avoid unnecessarily obfuscating the present invention.

1. OVERVIEW

This overview presents a brief description of some aspects of an embodiment of the present invention, and is not extensive or exhaustive. Moreover, this overview should not be understood as identifying any particularly significant aspects or elements of the embodiment, nor as indicating the scope of the possible embodiment in particular, nor the invention in general.

In overview, a class of embodiments reduces, in some circumstances, the latency and computational complexity typically caused by performing one type of signal processing, e.g. acoustic echo cancellation, before or after a different type of signal processing, e.g. compression or decompression. Said reduction is achieved by avoiding one inverse transform operation and one forward transform operation. For example, consider a computer system configured to perform acoustic echo cancellation (AEC) on PCM audio or video data before compressing it for transmission or storage. According to a typical approach, the computer system would use a transform of a first type (e.g., having relatively exact convolution) to convert the PCM audio or video data into the frequency domain, perform AEC processing and then use the inverse of the transform of the first type to convert the processed audio or video data back to the time domain; thereafter, the computer system would use a transform of a second type (e.g., a critical or oversampled transform) to convert the processed time domain audio or video data into the frequency domain and then compresses it. In this example, said class of embodiments would, in some circumstances, use a transform of the second type to convert the PCM audio or video data into the frequency domain, perform AEC processing and then compress the processed (frequency domain) audio or video data, i.e. without first transforming it into the time domain and then back into the frequency domain, thereby reducing latency and computational effort. The class of embodiments identifies circumstances in which the desirability of reducing latency and computational effort outweighs the resulting degradation in signal processing performance.

For example, one aspect of the present disclosure provides an apparatus for processing audio or video data. The apparatus comprises an input for receiving audio or video data; a first transform module capable of generating first transform-domain audio or video data by at least applying a first transform to the audio or video data; and a first signal processing module connected to the first transform module and configured to generate processed first transform-domain audio or video data by at least applying first signal processing to the first transform-domain audio or video data. The apparatus further comprises a second transform module capable of generating second transform-domain audio or video data by at least applying a second transform to the audio or video data, the second transform being different from the first transform; a second signal processing module connected to the second transform module and configured to generate processed second transform-domain audio or video data by at least applying second signal processing to the second transform-domain audio or video data; an analysis module configured to analyze at least one of the audio or video data, the first transform-domain audio or video data, the processed first transform-domain audio or video data, the second transform-domain audio or video data or the processed second transform-domain audio or video data, and to determine at least in part therefrom whether to apply the first signal processing or the second signal processing; and a path selection module configured to, in response to the analysis module determining to apply the second signal processing, selectively channel the audio or video data from the input through the second transform module and the second signal processing module, thereby producing processed second transform-domain audio or video data, and send the processed second transform-domain audio or video data to a third signal processing module without applying any further transform.

Another aspect of the present disclosure provides an apparatus for processing audio or video data. The apparatus comprises: an input for receiving time-domain audio or video data; a first transform module capable of generating first transform-domain audio or video data by at least applying a first transform to the time-domain audio or video data; a first signal processing module capable of generating first processed transform-domain audio or video data by at least applying first signal processing to the first transform-domain audio or video data; and a conversion module capable of converting the first transform-domain audio or video data directly into second transform-domain audio or video data, the second transform-domain audio or video data being equivalent to data generated by applying a second transform to the audio or video data, the second transform being different from the first transform. The apparatus further comprises: a second signal processing module connected to the conversion module and configured to generate processed second transform-domain audio or video data by at least applying second signal processing to the second transform-domain audio or video data; an analysis module configured to analyze at least one of the time-domain audio or video data, the first transform-domain audio or video data, the processed first transform-domain audio or video data, the second transform-domain audio or video data or the processed second transform-domain audio or video data, and to determine at least in part therefrom whether to apply the first signal processing or the second signal processing; and a path selection module configured to, in response to the analysis module determining to apply the second signal processing, selectively channel the time-domain audio or video data from the first transform module through the conversion module and the second signal processing module, thereby producing processed second transform-domain audio or video data, and send the processed second transform-domain audio or video data to a third signal processing module without applying any further transform.

Optionally, in either or both apparatuses, the first transform is matched to the first signal processing; and the second transform is matched to subsequent processing, at least a part of said subsequent processing being performed by the third signal processing module.

Optionally, in either or both apparatuses, the determining to apply the second signal processing comprises determining that a signal to noise ratio of the time-domain audio or video data, of the first transform-domain audio or video data, of the processed first transform-domain audio or video data, of the second transform-domain audio or video data or of the processed second transform-domain audio or video data is below a predetermined threshold.

Optionally, in either or both apparatuses, the first transform comprises one of: a modulated complex lapped transform, a modified discrete sine transform, a quadrature mirror filter-bank transform, a DCT-I, II or IV transform or a variant or approximation of a Karhunen-Loève transform.

Optionally, in either or both apparatuses, the second transform comprises one of: a modified discrete cosine transform, a modified discrete Fourier transform, a complex quadrature mirror filter-bank transform, or a discrete Fourier transform.

Optionally, in either or both apparatuses, the second signal processing comprises at least one of: echo cancellation processing, noise estimation or suppression, or multiband dynamic range control or equalization.

Optionally, in either or both apparatuses, the first signal processing comprises at least one of: echo cancellation, or complex-valued frequency domain convolution or filtering.

Optionally, in either or both apparatuses, said third signal processing module is configured to perform third signal processing, the third signal processing comprising data compression.

Optionally, either or both apparatuses further comprises: an inverse transform module connected to the first signal processing module and capable of generating first processed time-domain audio or video data by at least applying an inverse transform to the first processed transform-domain audio or video data, the inverse transform being an inverse of the first transform, wherein the path selection module is further configured to, in response to the analysis module determining to apply the first signal processing, channel the time-domain audio or video data from the input through the first transform module, the first signal processing module and the inverse transform module, thereby producing processed audio or video data, and send the processed audio or video data to a third transform module, the third transform module being capable of generating third transform-domain audio or video data by at least applying a third transform to the audio or video data, the third transform being the same as the second transform.

Another aspect of the present disclosure provides a method of processing audio or video data, the method comprising receiving time-domain audio or video data; transforming the time-domain audio or video data to first frequency-domain audio or video data using a first transform which is matched to a first type of signal processing; and processing the first frequency-domain audio or video data using signal processing of the first type. The method further comprises transforming the processed first frequency-domain audio or video data to processed time-domain audio or video data using a transform which is the inverse of the first transform; transforming the processed time-domain audio or video data to second frequency-domain audio or video data using a second transform which is matched to a second type of signal processing; identifying time-domain audio or video data for which signal processing of the first type, after transformation using the second transform, would yield satisfactory results; transforming the identified time-domain audio or video data to frequency-domain identified audio or video data using the second transform, instead of using the first transform; and processing the identified frequency-domain audio or video data using signal processing of the first type.

Another aspect of the present disclosure provides a non-transitory computer readable storage medium comprising software instructions which, when performed by one or more processors of a computer apparatus, cause the computer apparatus to perform said method.

Another aspect of the present disclosure provides a computing device comprising one or more processors and one or more storage media storing a set of instructions which, when executed by the one or more processors, cause performance of said method.

Another aspect of the present disclosure provides an apparatus for processing audio or video data, the apparatus comprising: an input for receiving first transform-domain audio or video data; and a first signal processing module capable of generating processed first transform-domain audio or video data by at least applying first signal processing to the first transform-domain audio or video data. The apparatus further comprises a first inverse transform module capable of generating audio or video data by at least applying a first inverse transform to the first transform-domain audio or video data, the first inverse transform being the inverse of a first transform; and a second transform module connected to the first transform module and configured to generate second transform-domain audio or video data by at least applying a second transform to the audio or video data, the second transform being different from the first transform. The apparatus further comprises a second signal processing module connected to the second transform module and configured to generate processed second transform-domain audio or video data by at least applying second signal processing to the second transform-domain audio or video data; an analysis module configured to analyze at least one of the first transform-domain audio or video data, the processed first transform-domain audio or video data, the audio or video data, the second transform-domain audio or video data or the processed second transform-domain audio or video data, and to determine at least in part therefrom whether to apply the first signal processing or the second signal processing; and a path selection module configured to, in response to the analysis module determining to apply the first signal processing, selectively channel the first transform-domain audio or video data from the input to the first signal processing module, thereby producing processed first transform-domain audio or video data, and send the processed first transform-domain audio or video data to the first inverse transform module or a further inverse transform capable of generating audio or video data by at least applying a first inverse transform to the first transform-domain audio or video data.

Another aspect of the present disclosure provides an apparatus for processing audio or video data, the apparatus comprising: an input for receiving first transform-domain audio or video data; a first signal processing module capable of generating processed first transform-domain audio or video data by at least applying first signal processing to the first transform-domain audio or video data; a conversion module capable of converting the first transform-domain audio or video data directly into second transform-domain audio or video data; and a second signal processing module connected to the second transform module and configured to generate processed second transform-domain audio or video data by at least applying second signal processing to the second transform-domain audio or video data. The apparatus further comprises an analysis module configured to analyze at least one of the first transform-domain audio or video data, the processed first transform-domain audio or video data, the second transform-domain audio or video data or the processed second transform-domain audio or video data, and to determine at least in part therefrom whether to apply the first signal processing or the second signal processing; and a path selection module configured to, in response to the analysis module determining to apply the first signal processing, selectively channel the first transform-domain audio or video data from the input to the first signal processing module, thereby producing processed first transform-domain audio or video data, and send the processed first transform-domain audio or video data to an inverse transform capable of generating audio or video data by at least applying a first inverse transform to the first transform-domain audio or video data.

Optionally, in either or both apparatuses, the second transform is selected for its suitability for the first signal processing.

Optionally, in either or both apparatuses, the determining to apply the first signal processing comprises determining that a signal to noise ratio of the first transform-domain audio or video data, of the processed first transform-domain audio or video data, of the second transform-domain audio or video data or of the processed second transform-domain audio or video data is below a predetermined threshold.

Optionally, in either or both apparatuses, the first transform comprises one of: a modulated complex lapped transform, a modified discrete sine transform, a quadrature mirror filter-bank transform, a DCT-I, II or IV transform or a variant or approximation of a Karhunen-Loève transform.

Optionally, in either or both apparatuses, the second transform comprises one of: a modified discrete cosine transform, a modified discrete Fourier transform, a complex quadrature mirror filter-bank transform, or a discrete Fourier transform.

Optionally, in either or both apparatuses, the second signal processing comprises at least one of: echo cancellation processing, noise estimation or suppression, or multi-band dynamic range control or equalization.

Optionally, in either or both apparatuses, the first signal processing comprises at least one of: echo cancellation, or complex-valued frequency domain convolution or filtering.

Optionally, in either or both apparatuses, said third signal processing module is configured to perform third signal processing, the third signal processing comprising data compression.

Another aspect of the present disclosure provides a method of processing audio or video data, the method comprising: receiving first frequency-domain audio or video data; transforming the first frequency-domain audio or video data to time-domain audio or video data using a transform which is the inverse of the first transform; transforming the time-domain audio or video data to second frequency-domain audio or video data using a second transform which is matched to a second type of signal processing; and processing the second frequency-domain audio or video data using signal processing of the second type. The method further comprises identifying first frequency-domain audio or video data for which signal processing of the second type, before applying any further transformation, would yield satisfactory results; and processing the identified first frequency-domain audio or video data using signal processing of the first type.

Another aspect of the present disclosure provides a non-transitory computer readable storage medium comprising software instructions which, when performed by one or more processors of a computer apparatus, cause the computer apparatus to perform the method of the preceding paragraph. Another aspect of the present disclosure provides a computing device comprising one or more processors and one or more storage media storing a set of instructions which, when executed by the one or more processors, cause performance of said method.

2. EXAMPLE PERFORMANCE ATTRIBUTES OF A TRANSFORM

FIG. 1 illustrates the respective performances of three different transforms 105, 110, 115 according to eight different performance attributes 120, 125, 130, 135, 140, 145, 150, 155.

Of the three different transforms, a first transform is the FFT Overlap Save Transform 105; a second transform is the Modified Discrete Cosine Transform 110; and a third transform is the Modified Discrete Fourier Transform 115. These particular transforms are provided by way of example only; others will be readily apparent to those of ordinary skill in the art.

Of the eight different performance attributes, a first performance attribute is Exact Convolution 120; a second performance attribute is Inherent Latency 125; a third performance attribute is Filter Transitions 130; a fourth performance attribute is Independent Bands 135; a fifth performance attribute is Computational Complexity 140; a sixth performance attribute is Analytic 145; a seventh performance attribute is Critical or Oversampled 150; and an eighth performance attribute is Reconstruction Distortion 155. These particular performance attributes are provided by way of example only; others will be readily apparent to those of ordinary skill in the art.

Exact Convolution 120: the extent to which processing a signal in the relevant transform domain is equivalent to convolving the signal in the time domain. For instance, using overlap-and-save with a fixed signal gives exactly the same convolution as convolving the input with the fixed signal in time domain.

Inherent Latency 125: refers to the extent of a delay introduced by a given transform and its inverse. The delay comprises the time it takes to accumulate the input samples (usually in a frame manner) and the time it takes to reconstruct the signal (i.e., converting back to time domain).

Filter Transitions 130: the extent to which a changing filtering process, e.g., the bands are multiplied with different time-varying gains frame by frame, does not introduce errors into a signal. For example, a transform which performs poorly in respect of the Filter Transitions 130 performance attribute will result in an output signal comprising noticeable artifacts (particularly between frame boundaries).

Independent Bands 135: the extent to which frequency bands in the relevant transform domain are independent, isolated or decorrelated from each other. The more independent the frequency bands are, the better they are for analyzing signal content.

Computational Complexity 140: the computational burden, measured e.g. in terms of the number of required operations, the number of multiplications per input sample and/or the memory requirement for storing the intermediate variables, associated with a given transform.

Analytic 145: whether or not the signal resulting from a given transform is complex-valued and has no negative frequency. For example, the MDCT scores zero in respect of the Analytic 145 performance attribute, as MDCT coefficients all are real. Complex-valued signals with no negative frequency tend to be relatively suitable for mathematical operations and makes certain attributes more accessible.

Critical or Oversampled 150: whether the number of samples in a transform-domain signal is equal to or greater than the number of samples in the corresponding pre-transform signal. For example, the MDCT is critically sampled, as its pre- and post-transform signals have the same number of samples. Oversampled transforms produce transform-domain signals which have more samples than the corresponding pre-transform signals. For instance, the modulated complex lapped transform has an oversample rate of 2 (N real input samples converted to N complex frequency domain samples).

Reconstruction Distortion 155: refers to the difference between a pre- and a post-transform (i.e., time-domain) signal if no operation was performed on the intervening transform domain signal. Ideally, a given transform would have perfect performance in respect of the Reconstruction Distortion 155 performance attribute, i.e. the post-transform signal would exactly match the pre-transform signal.

As shown in FIG. 1, the FFT Overlap Save Transform 105 outperforms the other two 110, 115 with respect to the first and second performance attributes 120, 125; the Modified Discrete Cosine Transform 110 outperforms the other two 105, 115 with respect to the seventh performance attribute 150; and the Modified Discrete Fourier Transform 115 outperforms the other two 105, 110 with respect to the third performance attribute 130.

It will be appreciated that an overall performance metric for one of the transforms 105, 110, 115 would depend on respective weightings applied to the performance attributes 120, 125, 130, 135, 140, 145, 150, 155, and that the applied respective weightings may depend on the type of signal processing to which the transforms 105, 110, 115 are to be matched. For example, and referring to FIG. 1, if a type of signal processing necessitated the first performance attribute 120 to receive a high weighting, then the overall performance of the second transform 110 would not be high, and the second transform 110 would not be considered a good match for the type of signal processing in question.

According to embodiments of the present disclosure, in effect, the respective weightings may be adapted in real time based on factors other than (i.e., in addition to) the type of signal processing to which the transforms 105, 110, 115 are to be matched. For example, a computer system according to an embodiment may determine that, at a certain moment, reducing latency has become a high priority, and so may apply, in real time, a high weighting to the inherent latency performance attribute 125. Consequently, a currently-used transform would be switched, in real time, from the FFT Overlap Save Transform 105 (selected for its good performance with respect to the Exact Convolution performance attribute 120) to the Modified Discrete Fourier Transform 115. As a result, latency would be reduced at the expense of increased signal processing errors.

It will also be appreciated that the principles described herein can be used to select not only between different transforms, but also between the same transform according to different parameters.

3. EXAMPLE PROCESSING ARCHITECTURES

Figure 2A:
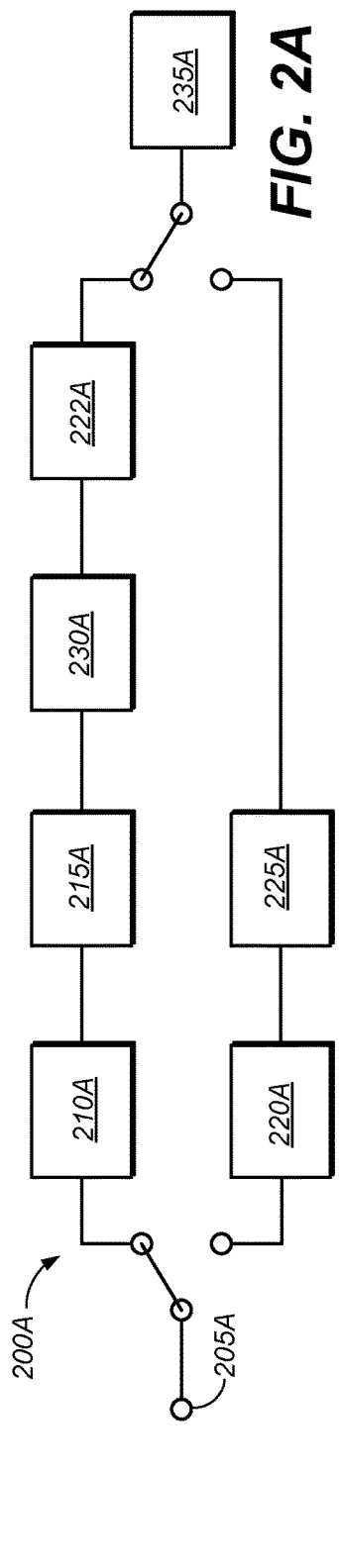
FIGS. 2A, 2B, 2C, 3A and 3B schematically show respective different example processing architectures for transforming audio or video data the time domain to the frequency domain, and/or vice versa, and for processing the audio or video data, in accordance with embodiments of the present disclosure.

As shown in FIG. 2A, a first processing architecture 200A comprises: an input 205A; in an upper path, a first transform module 210A, a first signal processing module 215A, an inverse transform module 230A and a further transform module 222A; in a lower path, a second transform module 220A and a second signal processing module 225A; and a third signal processing module 235A.

Having regard to the upper path, the first transform module 210A is selectively connected to the input 205A and may receive time domain audio or video data therefrom. The first signal processing module 215A is connected to the first signal transform module 210A and may receive frequency domain audio or video data therefrom. The inverse transform module 230A is connected to the first signal processing module 215A and may receive processed frequency domain audio or video data therefrom. The further transform module 222A is connected to the inverse transform module 230A and may receive processed time domain audio or video data therefrom. The third signal processing module 235A is selectively connected to the further transform module 222A and may receive processed frequency domain audio or video data therefrom.

Having regard to the lower path, the second transform module 220A is selectively connected to the input 205A and may receive time domain audio or video data therefrom. The second signal processing module 225A is connected to the second signal transform module 210A and may receive frequency domain audio or video data therefrom. The third signal processing module 235A is selectively connected to the second signal processing module 225A and may receive processed frequency domain audio or video data therefrom.

The subsequent modules connected to the further signal processing module 235A, and configured to handle and/or further process audio or video data that received from the further signal processing module 235A, may be conventional and need not be described here.

Figure 2B:
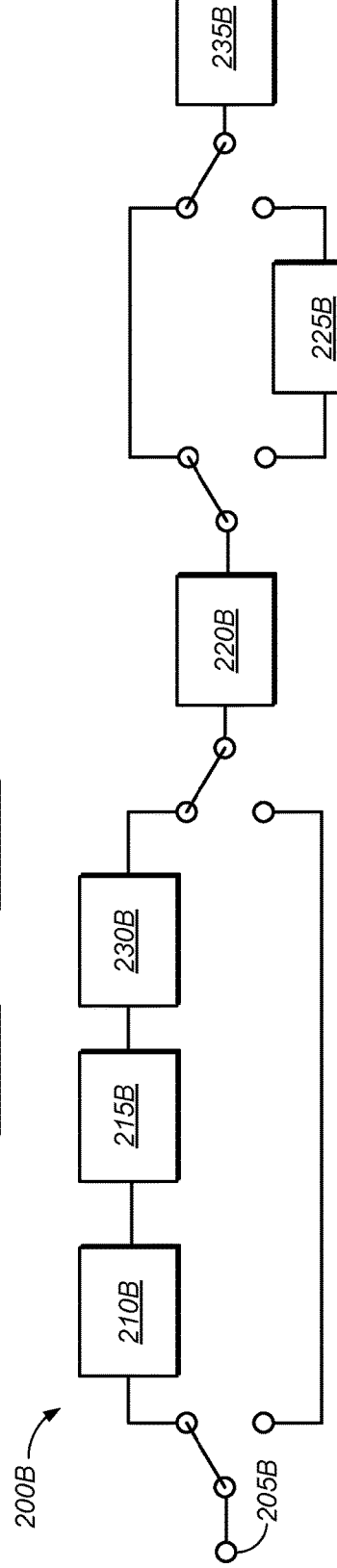

As shown in FIG. 2B, a second processing architecture 200B comprises: an input 205B; in an upper path, a first transform module 210B, a first signal processing module 215B and an inverse transform module 230B; in a lower path, second signal processing module 225B; and, connected to the upper and lower paths, a second transform module 220B and a third signal processing module 235B.

Having regard to the upper path, the first transform module 210B is selectively connected to the input 205B and may receive time domain audio or video data therefrom. The first signal processing module 215B is connected to the first signal transform module 210B and may receive frequency domain audio or video data therefrom. The inverse transform module 230B is connected to the first signal processing module 215B and may receive processed frequency domain audio or video data therefrom. The second transform module 220B is selectively connected to the inverse transform module 230B and may receive processed time domain audio or video data therefrom. The third signal processing module 235B is selectively connected to the second transform module 220B processed frequency domain audio or video data therefrom.

Having regard to the lower path, the second transform module 220B is selectively connected to the input 205A and may receive time domain audio or video data therefrom. The second signal processing module 225B is connected to the second signal transform module 210B and may receive frequency domain audio or video data therefrom. The third signal processing module 235B is selectively connected to the second signal processing module 225B and may receive processed frequency domain audio or video data therefrom.

The subsequent modules connected to the further signal processing module 235B, and configured to handle and/or further process audio or video data that received from the further signal processing module 235B, may be conventional and need not be described here.

Figure 2C:
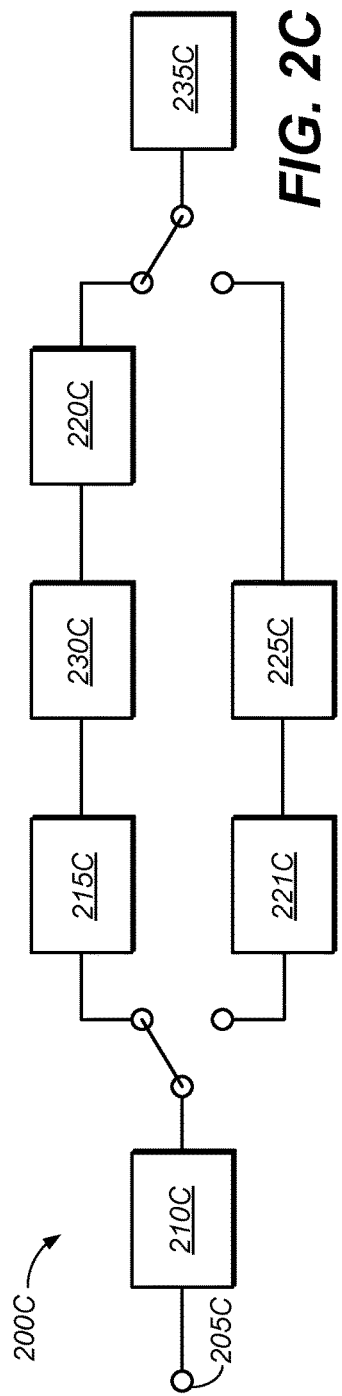

As shown in FIG. 2C, a third processing architecture 200C comprises: an input 205C; a first transform module 210C; in an upper path, a first signal processing module 215C, an inverse transform module 230C and a second transform module 220C; in a lower path, a conversion module 221C and a second signal processing module 225C; and a third signal processing module 235C.

The first transform module 210C is connected to the input 205C and may receive time domain audio or video data therefrom.

Having regard to the upper path, the first signal processing module 215C is selectively connected to the first signal transform module 210C and may receive frequency domain audio or video data therefrom. The inverse transform module 230C is connected to the first signal processing module 215C and may receive processed frequency domain audio or video data therefrom. The second transform module 220C is connected to the inverse transform module 230C and may receive processed time domain audio or video data therefrom. The third signal processing module 235C is selectively connected to the further transform module 222C and may receive processed frequency domain audio or video data therefrom.

Having regard to the lower path, the conversion module 221C is selectively connected to the first signal transform module 210C and may receive frequency domain audio or video data therefrom. The second signal processing module 225C is connected to the conversion module 221C and may receive converted frequency domain audio or video data therefrom. The third signal processing module 235C is selectively connected to the second signal processing module 225C and may receive processed frequency domain audio or video data therefrom.

The subsequent modules connected to the further signal processing module 235C, and configured to handle and/or further process audio or video data that received from the further signal processing module 235C, may be conventional and need not be described here.

For example, the first, second and third processing architectures 200A, 200B, 200C, described above, may receive audio data captured by a microphone, and may perform acoustic echo cancellation on the audio data before it is compressed for storage or transmission. In which case, these architectures may be seen as pre-processing stages.

Figure 3A:
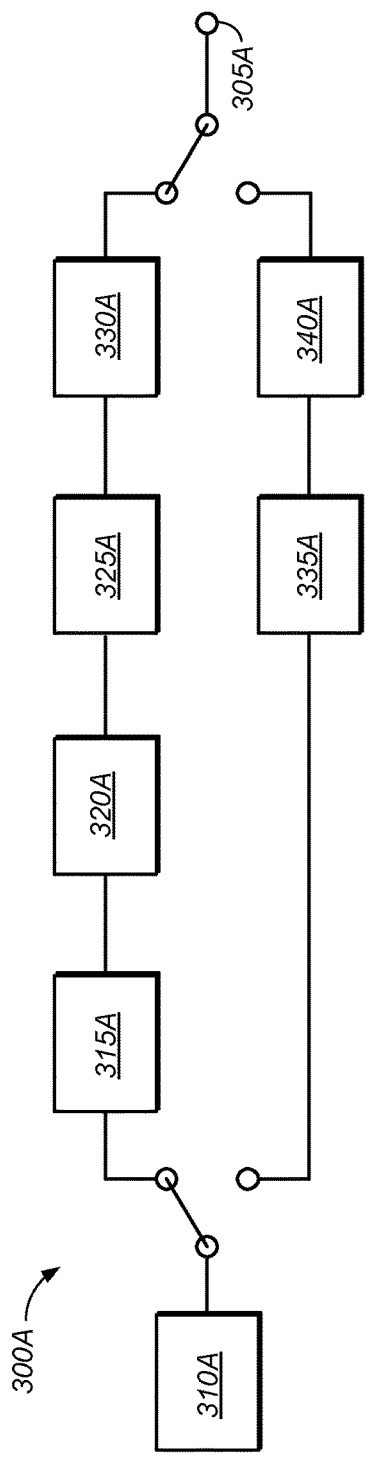

As shown in FIG. 3A, a fourth processing architecture 300A comprises: a first signal processing module 310A; in an upper path, a first inverse transform module 315A, a first transform module 320A, a second signal processing module 325A and a second inverse transform module 330A; in a lower path, a third signal processing module 335A and a third inverse transform module 340A; and an output 305A.

Having regard to the upper path, the first inverse transform module 315A is selectively connected to the first signal processing module 310A and may receive frequency domain audio or video data therefrom. The first transform module 320A is connected to the first inverse transform module 315A and may receive time domain audio or video data therefrom. The second signal processing module 325A is connected to the first transform module 320A and may receive frequency domain audio or video data therefrom. The second inverse transform module 330A is connected to the second signal processing module 325A and may receive processed frequency domain audio or video data therefrom. The output 305A is selectively connected to the second inverse transform module 330A and may receive processed time domain audio or video data therefrom.

Having regard to the lower path, the third signal processing module 335A is selectively connected to the first signal processing module 310A and may receive frequency domain audio or video data therefrom. The third inverse transform module 340A is connected to the third signal processing module 335A and may receive processed frequency domain audio or video data therefrom. The output 305A is selectively connected to the third inverse transform module 340A and may receive processed time domain audio or video data therefrom.

Figure 3B:
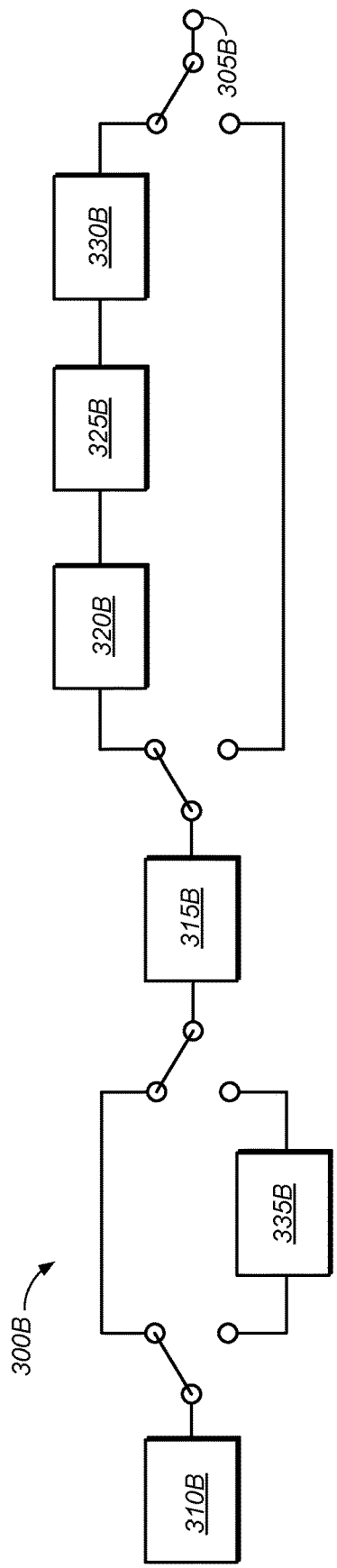

As shown in FIG. 3B, a fifth processing architecture 300B comprises: a first signal processing module 310B; a first inverse transform module 315B; in an upper path, a first transform module 320B, a second signal processing module 325B and a second inverse transform module 330B; in a lower path, a third signal processing module 335B; and an output 305B.

The first inverse transform module 315B is selectively connected to the first signal processing module 3108 and may receive frequency domain audio or video data therefrom.

Having regard to the upper path, that the first transform module 320B is selectively connected to the first inverse transform module 315B and may receive time domain audio or video data therefrom. The second signal processing module 325B is connected to the first transform module 320B and may receive frequency domain audio or video data therefrom. The second inverse transform module 330B is connected to the second signal processing module 325B and may receive processed frequency domain audio or video data. The output 305B is selectively connected to the second inverse transform module 330B and may receive processed time domain audio or video data.

Having regard to the lower path, it can be seen that the third signal processing module 335B is selectively connected to the first signal processing module 3108 and may receive frequency domain audio or video data therefrom.

The first inverse transform module 315B is selectively connected to the third signal processing module 335B and may receive processed frequency domain audio or video data therefrom. The output 305B is selectively connected to the first inverse transform module 315B and may receive processed time domain audio or video data therefrom.

For example, the fourth and fifth processing architectures 200A, 200B, 200C, described above, may operate on audio data captured which was compressed when it was received or retrieved, to perform, after decompression, acoustic echo cancellation on the audio data before it is finally converted into PCM audio data for rendering. In which case, these architectures may be seen as post-processing stages.

In various embodiments, each of the first to fifth processing architectures 200A, 200B, 200C, 300A, 300B comprises at least one common buffer (not shown) which is shared by the upper and lower paths, which permits instantaneous transform switching without breaking the continuity of any analysis or processing. Preferably, the input buffering prior to the transform is continuous (not switched). It is typical for e.g. a filter bank, a time domain overlap-add reconstruction module and an overlapping transform to be associated with a respective buffer; a further advantage resulting from the common buffer(s) is that the area complexity of implementing the upper and lower paths is less than the sum of the individual complexities of the paths (i.e., if each were implemented with its own buffer or buffers).

Processing architectures of the type described above may receive time domain audio or video data which are shifted in frames. This may involve a sliding window of a length which is multiple times the size of the frame. For instance, for audio data representative of a speech signal, with a sampling rate of 16 kHz, the frame size may be 20 milliseconds, the window length may be 640 samples (40 milliseconds), in which case 320 new samples would be shifted into the window in each frame.

It should be noted that FIGS. 2A, 2B, 2C, 3A and 3B all schematically show switches for selecting between the respective upper and lower paths, for ease of understanding. In practical implementations, the mechanisms used for selecting between the respective upper and lower paths are unlikely to be switches; suitable mechanisms are discussed below, in section 6 Example Control Module and Method.

4. EXAMPLE TRANSFORM MODULES

Having regard to each of the first to fifth processing architectures 200A, 200B, 200C, 300A, 300B, in various embodiments, the first transform module 210A, 210B, 210C, 320A, 320B is configured to apply a first transform to the time domain audio or video data that it receives.

In at least one embodiment, the first transform is matched to the subsequent signal processing module 215A, 215B, 215C, 325A, 325B.

The processing performed by the subsequent signal processing module 215A, 215B, 215C, 325A, 325B may be such that a high weighting should be applied to the Exact Convolution performance attribute 120, and, consequently, the first transform may be selected from, for example, a modulated complex lapped transform, a modified discrete Fourier transform, a complex quadrature mirror filter-bank transform, or a discrete Fourier transform; other suitable transforms may be apparent to those of ordinary skill in the art.

For example, in order to process audio or video data in the frequency domain in a manner which is similar to a time domain linear convolution process, a transform which outputs real and imaginary parts is often selected (e.g., a modulated complex lapped transform).

For example, in a speech enhancement system, input audio data may comprise background noise and acoustic echo. Both the background noise and the acoustic echo should be suppressed, which requires individual processing of frequency bins. This requires good linear convolution and bin to bin separation, and so any of the above-mentioned transforms from which the first transform may be selected may be suitable.

Having regard to each of the first to fifth processing architectures 200A, 200B, 200C, 300A, 300B, in various embodiments, the inverse transform module 230A, 230B, 230C, 330A, 330B is configured to apply an inverse transform to the frequency domain audio or video data that it receives, the inverse transform being the inverse of said first transform.

Having regard to each of the first to third processing architectures 200A, 200B, 200C, in various embodiments, the second transform module 220A, 220B, 220C is configured to apply a second transform to the time domain audio or video data that it receives. In at least one embodiment, the second transform is matched to the third signal processing module 235A, 235B, 235C.

The processing performed by the third signal processing module 235A, 235B, 235C may be such that a high weighting should be applied to the Critical or Oversampled performance attribute 150, and, consequently, the second transform may be selected from, for example, a modified discrete cosine transform, modified discrete sine transform, quadrature mirror filter-bank transform, a DCT-I, II or IV transform or a variant or approximation of a Karhunen-Loève transform; other suitable transforms may be apparent to those of ordinary skill in the art.

Having regard to the first processing architecture 200A, in various embodiments, the further transform module 222A is configured to apply a further transform to the frequency domain audio or video data that it receives. In at least one embodiment, the further transform is matched to the third signal processing module 235A; therefore, the further transform is selected to be the same as or equivalent to the second transform.

Having regard to the third processing architecture 200C, in various embodiments, the conversion module 221C is configured to perform a conversion process on the frequency domain audio or video data that it receives. In at least one embodiment, a combination of the first transform followed by the conversion process is matched to the third signal processing module 235C.

As noted above, the processing performed by the third signal processing module 235A, 235B, 235C may be such that a high weighting should be applied to the Critical or Oversampled performance attribute 150. In at least one embodiment, applying the first transform followed by the conversion process is equivalent to performing the second transform. In at least one embodiment, the first transform is chosen as the modulated complex lapped transform, the second transform is chosen as either the modified discrete cosine transform or the modified discrete sine transform and the conversion process comprises discarding or ignoring the imaginary part, and optionally scaling the real part, of the audio or video data provided by the first transform module 210C; thus, only the (scaled) real part of the frequency domain audio or video data provided by the first transform module 210C is provided to the second signal processing module 225C. In at least one embodiment, the first transform is chosen as the Modified Discrete Fourier Transform, the second transform is chosen as the modulated complex lapped transform and the conversion process comprises multiplying, with a phase shift, each frequency band represented by the audio or video data provided by the first transform module 210C; thus, a scaled and phase-shifted version of the audio or video data provided by the first transform module 210C is provided to the second signal processing module 225C.

Having regard to each of the fourth and fifth processing architectures 300A, 300B, in various embodiments, the inverse transform module 315A, 315B, 340A is configured to apply an inverse transform to the frequency domain processed audio or video data that it receives, the inverse transform being the inverse of the second transform.

In at least one embodiment, the transform in the upper path may be the same as the transform in the lower path but with different parameters, e.g. a different block size.

5. EXAMPLE SIGNAL PROCESSING MODULES

Having regard to each of the first to third processing architectures 200A, 200B, 200C, in various embodiments, the first signal processing module 215A, 215B, 215C is configured to perform processing on the frequency domain audio or video data that it receives. In at least one embodiment, said processing is such that typically a high weighting would be applied to the Exact Convolution performance attribute 120. For example, the processing in question may comprise one or more of: complex-valued frequency domain convolution (or filtering); echo cancellation; noise estimation or suppression; multi-band dynamic range control; or equalization. More generally, the processing could be such as to require a heavy convolution to filter the transform-domain audio or video data (e.g. applying complex gains to bins rather than simple real gains), and/or to require significantly different gains on neighboring bins (e.g. even if the gains are all real). The manner in which the processing is performed by the first signal processing module 215A, 215B, 215C is not critical; many suitable solutions will be apparent to those of ordinary skill in the art. For example, suitable echo cancellation techniques are described in "J. Benesty and Y. Huang, editors, Adaptive Signal Processing—Applications to Real-World Problems. Springer-Verlag, Berlin, Germany, 2003"; suitable noise suppression techniques are described in "J. Benesty, J. Chen, Y. Huang, and I. Cohen, Noise Reduction in Speech Processing. Springer-Verlag, Berlin, Germany, 2009"; and suitable equalization and dynamic range compression techniques are described in "Atti, Andreas Spanias, Ted Painter, Venkatraman (2006), Audio Signal Processing and Coding, Hoboken, N.J.: John Wiley & Sons. p. 464. ISBN 0-471-79147-4".

Having regard to each of the fourth and fifth processing architectures 300A, 300B, in various embodiments, the second signal processing module 325A, 325B is equivalent to the first signal processing module 215A, 215B, 215C of the first to third processing architectures 200A, 200B, 200C.

Having regard to each of the first to third processing architectures 200A, 200B, 200C, in various embodiments, the second signal processing module 225A, 225B, 225C is configured to perform signal processing on the frequency domain audio or video data that it receives. In at least one embodiment, said signal processing is such that typically a high weighting would be applied to the Exact Convolution performance attribute 120. For example, the signal processing in question may comprise one or more of echo cancellation; noise estimation or suppression; multi-band dynamic range control; or equalization. The manner in which the processing is performed is not critical; many suitable solutions will be apparent to those of ordinary skill in the art.

Having regard to each of the fourth and fifth processing architectures 300A, 300B, in various embodiments, the third signal processing module 335A, 335B is equivalent to the second signal processing module 225A, 225B, 225C of the first to third processing architectures 200A, 200B, 200C.

Having regard to each of the first to third processing architectures 200A, 200B, 200C, in various embodiments, the further signal processing module 235A is configured to perform signal processing on the frequency domain audio or video data that it receives. Said signal processing may be such that typically a high weighting would be applied to the Critical or Oversampled performance attribute 150. For example, the processing in question may comprise data compression. The manner in which the processing is performed by the third signal processing module 235A, 235B, 235C is not critical; many suitable solutions will be apparent to those of ordinary skill in the art.

Having regard to each of the fourth and fifth processing architectures 300A, 300B, in various embodiments, the first signal processing module 310A, 310B is configured to perform signal processing on the frequency domain audio or video data it receives, the signal processing being the inverse of that performed by the third signal processing module 235A, 235B, 235C of each of the first to third processing architectures 200A, 200B, 200C.

6. EXAMPLE CONTROL MODULE AND METHOD

Figure 4A:
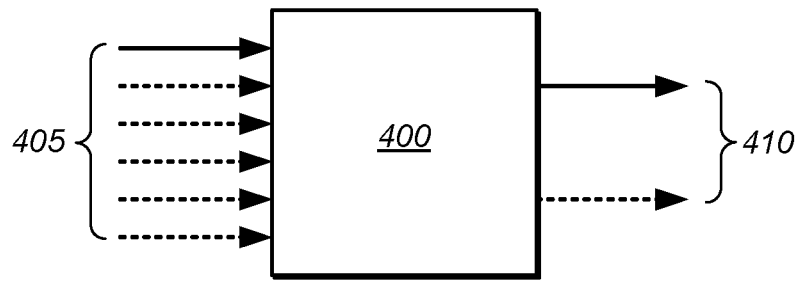
FIGS. 4A and 4B schematically show, respectively, a monitor-and-control module and steps performed by the monitor-and-control module, for monitoring and controlling the example processing architectures of FIGS. 2A, 2B, 2C, 3A and 3B, in accordance with embodiments of the present disclosure.

FIG. 4A illustrates a monitor and control module 400.

In various embodiments, the monitor and control module 400 is configured to monitor audio or video data as it passes through the processing architectures 200A, 200B, 200C, 300A, 300B described hereinabove.

Figure 4B:
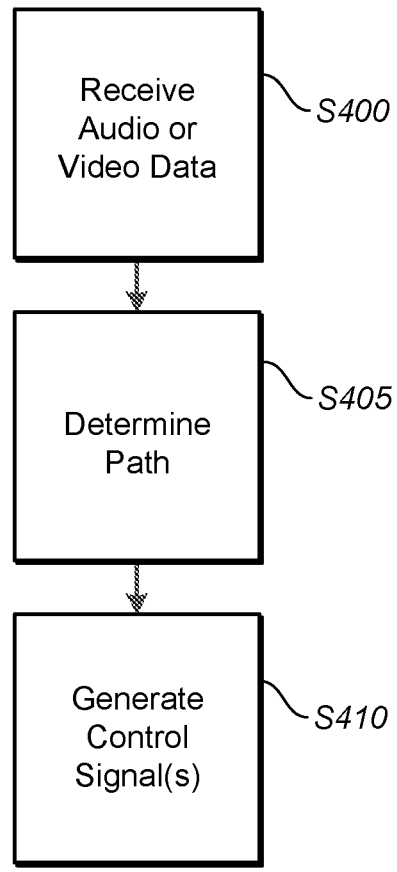

As shown in FIGS. 4A and 4B, in at least one embodiment the monitor and control module 400 receives, at step S400, audio or video data 405 from the respective processing architecture 200A, 200B, 200C, 300A, 300B.

The audio or video data 405 may comprises one, all or any suitable combination of: time domain audio or video data, before or after processing or transformation by the processing or transform (including inverse transform) modules of the respective processing architecture 200A, 200B, 200C, 300A, 300B; or frequency domain audio data before or after processing or transformation by processing or transform (including inverse transform) modules of the respective processing architecture 200A, 200B, 200C, 300A, 300B.

In various embodiments, the monitor and control module 400 is configured to control the processing architectures 200A, 200B, 200C, 300A, 300B described hereinabove.

As shown in FIGS. 4A and 4B, in at least one embodiment the monitor and control module 400 is configured to generate, at step S410, one or more control signals 410 suitable for controlling the processing architectures 200A, 200B, 200C, 300A, 300B.

The control signal(s) 410 include at least one signal suitable for selecting, for the respective processing architecture 200A, 200B, 200C, 300A, 300B, either the upper path or the lower path. This may be thought of, conceptually, as controlling the positions of the switches shown in FIGS. 2A, 2B, 2C, 3A and 3B. In practice, selecting either the upper path or the lower path can be implemented in software using conditional subroutines (e.g., based on at least one of the following three criteria: latency; complexity; or band separation), such as decision trees.

As shown in FIG. 4B, in at least one embodiment the monitor and control module 400 is configured to determine, in step S405, which path of the respective processing architecture 200A, 200B, 200C, 300A, 300B is currently the appropriate path.

FIG. 4C shows example pseudo code of a Determine_Path algorithm for determining, in step S405, which path of the respective processing architecture 200A, 200B, 200C, 300A, 300B is currently the appropriate path.

According to the pseudo code shown in FIG. 4C, in at least one embodiment, the monitor and control module 400, as part of step S405, obtains an indication of acceptable latency for processing the current frame of the audio or video data; in the pseudo code shown in FIG. 4C, this indication is denoted by the parameter Acceptable Latency. For example, in a teleconference system, during a teleconference call, if it is determined that all speech comes predominantly from one participant (for example, if the one participant were giving a presentation), then the acceptable latency may be higher than usual. The manner in which the indication is obtained is not essential to the embodiments disclosed herein; the skilled person will readily recognize, without any inventive effort, various suitable ways of obtaining the indication.

For example, obtaining the indication of acceptable latency may comprise receiving input from other modules, e.g., one way transmission latency in a realtime communication system.

Signal processing depth depends on what task is being performed for a current frame of audio data: for instance, convolution typically is associated with a high signal processing depth. The indication of acceptable latency may be compared with a current indication of signal depth from the respective processing modules.

According to the pseudo code shown in FIG. 4C, in at least one embodiment, the monitor and control module 400, as part of step S405, obtains an indication of a classification of the signal represented by the audio or video data; in the pseudo code shown in FIG. 4C, this indication is denoted by the parameter Data Classification. For example, the classification may indicate that said signal is classified as one of a speech signal; a noise signal; or a music signal. The manner in which the classification is obtained is not essential to the embodiments disclosed herein; the skilled person will readily recognize, without any inventive effort, various suitable ways of obtaining the indication.

For example, obtaining the indication of the classification of the signal may comprise using a voice activity detector (VAD) for voice/noise classification or a music/speech classifier. These are known to those skilled in the art.

According to the pseudo code shown in FIG. 4C, in at least one embodiment, the monitor and control module 400, as part of step S405, obtains an indication of processor availability (e.g. a number CPU cycles) for the respective processing architecture 200A, 200B, 200C, 300A, 300B; in the pseudo code shown in FIG. 4C, this indication is denoted by the parameter Available Cycles. For example, if "heavy" preprocessing is performed on a signal, there may be relatively little processor availability (e.g. a number CPU cycles) for the respective processing architecture 200A, 200B, 200C, 300A, 300B. The manner in which the indication is obtained is not essential to the embodiments disclosed herein; the skilled person will readily recognize, without any inventive effort, various suitable ways of obtaining the indication.

For example, obtaining the indication of processor availability may comprise estimating processor availability from a system-level perspective (e.g., if digital signal processing is currently being performed, then a current extent of processing being performed can be estimated based e.g. on the type of digital signal processing in question).

According to the pseudo code shown in FIG. 4C, in at least one embodiment, the monitor and control module 400, as part of step S405, obtains an estimate of the extent of signal processing required for a current frame of the audio or video data 410; in the pseudo code shown in FIG. 4C, this indication is denoted by the parameter Required Signal Processing. The manner in which the estimate is obtained is not essential to the embodiments disclosed herein; the skilled person will readily recognize, without any inventive effort, various suitable ways of obtaining the estimate.

For example, obtaining the estimate of the extent of signal processing required may comprise estimating the length of a corresponding time domain linear filter that the current frame of the audio or video data would need to be convolved with.

Additionally or alternatively, obtaining the estimate of the extent of signal processing required may comprise estimating a signal-to-noise ratio of the current frame of the audio or video data. For example, one or more of the processing modules of the respective processing architecture 200A, 200B, 200C, 300A, 300B may be configured to perform acoustic echo cancellation (AEC), and the monitor and control module 400 may receive or calculate respective total energies of an estimated echo signal and an estimated error signal. The magnitude of the total energy of the estimated error signal may then be divided by the magnitude of the total energy of the estimated echo signal, and the result may be compared with a predetermined threshold which, for example, may be 32 (or 15 dB in the power domain). It will be appreciated that if the AEC has converged and the magnitude of the total energy of the estimated error signal is significantly larger than the magnitude of the total echo signal energy, e.g. by a factor of 32, then it is likely that there is double talk and the local speech is much stronger than the residual echo and therefore a lower convolution performance can be tolerated because the stronger local speech will mask the residual echo. For AEC, if there was a strong reference signal, then "heavy" AEC probably would be necessary, and so the upper path of the respective processing architecture 200A, 200B, 200C, 300A, 300B would be appropriate. For noise reduction, if there was a low signal to noise ratio (SNR), the upper path of the respective processing architecture 200A, 200B, 200C, 300A, 300B would be appropriate, to provide finer gain modifications (given that it has better convolution properties than the lower path).

As can be seen in FIG. 4C, the first step of the Determine_Path algorithm is to set the variable Path to a value of Upper_Path. That is, according to the Determine_Path algorithm, the upper path of the respective processing architecture 200A, 200B, 200C, 300A, 300B is the default path.

Next in the Determine_Path algorithm is an if-then statement which sets the value of the variable Pass to a value of Lower_Path if its condition is met. The condition in question is the parameter Acceptable Latency, discussed hereinabove, having a value which is less than the value of a predetermined Latency Threshold. The value of the predetermined Latency Threshold is based on the latency of the upper path of the respective processing architecture 200A, 200B, 200C, 300A, 300B. Thus, if the latency of the upper path exceeds the current value of the aforementioned Acceptable Latency parameter, then the lower path of the respective processing architecture 200A, 200B, 200C, 300A, 300B is used instead of the upper path (since the lower path is associated with a lower latency).

Thereafter in the Determine_Path algorithm is a further if-then statement which sets the value of the variable Pass to a value of Lower_Path if its condition is met. Here the condition in question is the parameter Available Cycles, discussed hereinabove, having a value which is less than the value of a predetermined Cycles Threshold. The value of the predetermined Cycles Threshold is based on the computational burden of the upper path of the respective processing architecture 200A, 200B, 200C, 300A, 300B. Thus, if the currently-available computational resources are insufficient for said computational burden, then the lower path of the respective processing architecture 200A, 200B, 200C, 300A, 300B is used instead of the upper path (since the lower path is associated with a lower computational burden).

Thereafter in the Determine_Path algorithm is a yet further if-then statement which sets the value of the variable Pass to a value of Lower_Path if its condition is met. Here the condition in question is the parameter Current Band Separation, discussed hereinabove, having a value which is less than the value of a predetermined Cycles Threshold. The value of the predetermined Cycles Threshold is based on the computational burden of the upper path of the respective processing architecture 200A, 200B, 200C, 300A, 300B. Thus, if the currently-available computational resources are insufficient for said computational burden, then the lower path of the respective processing architecture 200A, 200B, 200C, 300A, 300B is used instead of the upper path (since the lower path is associated with a lower computational burden).

Thereafter in the Determine_Path algorithm is a still further if-then statement which sets the value of the variable Pass to a value of Lower_Path if its condition is met. Here the condition in question is the parameter Required Signal Processing, discussed hereinabove, having a value which is less than the value of a predetermined Signal Processing Threshold. The value of the predetermined Signal Processing Threshold is based on the performance of the transform in the upper path of the respective processing architecture 200A, 200B, 200C, 300A, 300B with respect to the performance attribute Independent Bands 135. Thus, if the signal processing required is not so "heavy" that high performance is not required with respect to the performance attribute Independent Bands 135, then the lower path of the respective processing architecture 200A, 200B, 200C, 300A, 300B is used instead of the upper path (since the lower path has lower performance with respect to the performance attribute And Bands 135 than the upper path has).

Thereafter in the Determine_Path algorithm is a still further if-then statement which sets the value of the variable Pass to a value of Lower_Path if its condition is met. Here the condition in question is the parameter Data Classification, discussed hereinabove, having a value of "noise" (indicating that the current frame of audio or video data is representative mainly of a noise) signal. For a noise signal, it does not really matter if a transform and/or the subsequent processing introduces artifacts because the noise signal will anyway be suppressed to very soft levels, and so the lower path of the respective processing architecture 200A, 200B, 200C, 300A, 300B is chosen. (On the other hand, for a music signal, introducing artifacts is highly undesirable, and so the upper path of the respective processing architecture 200A, 200B, 200C, 300A, 300B should be used if possible.)

In at least one embodiment, a computing device comprising one or more processors and one or more storage media storing a set of instructions which, when executed by the one or more processors, cause performance of any of these operations, methods, process flows, etc.

7. IMPLEMENTATION MECHANISMS—HARDWARE OVERVIEW

In at least one embodiment, the techniques described herein are implemented by one or more special-purpose computing devices. The special-purpose computing device(s) may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
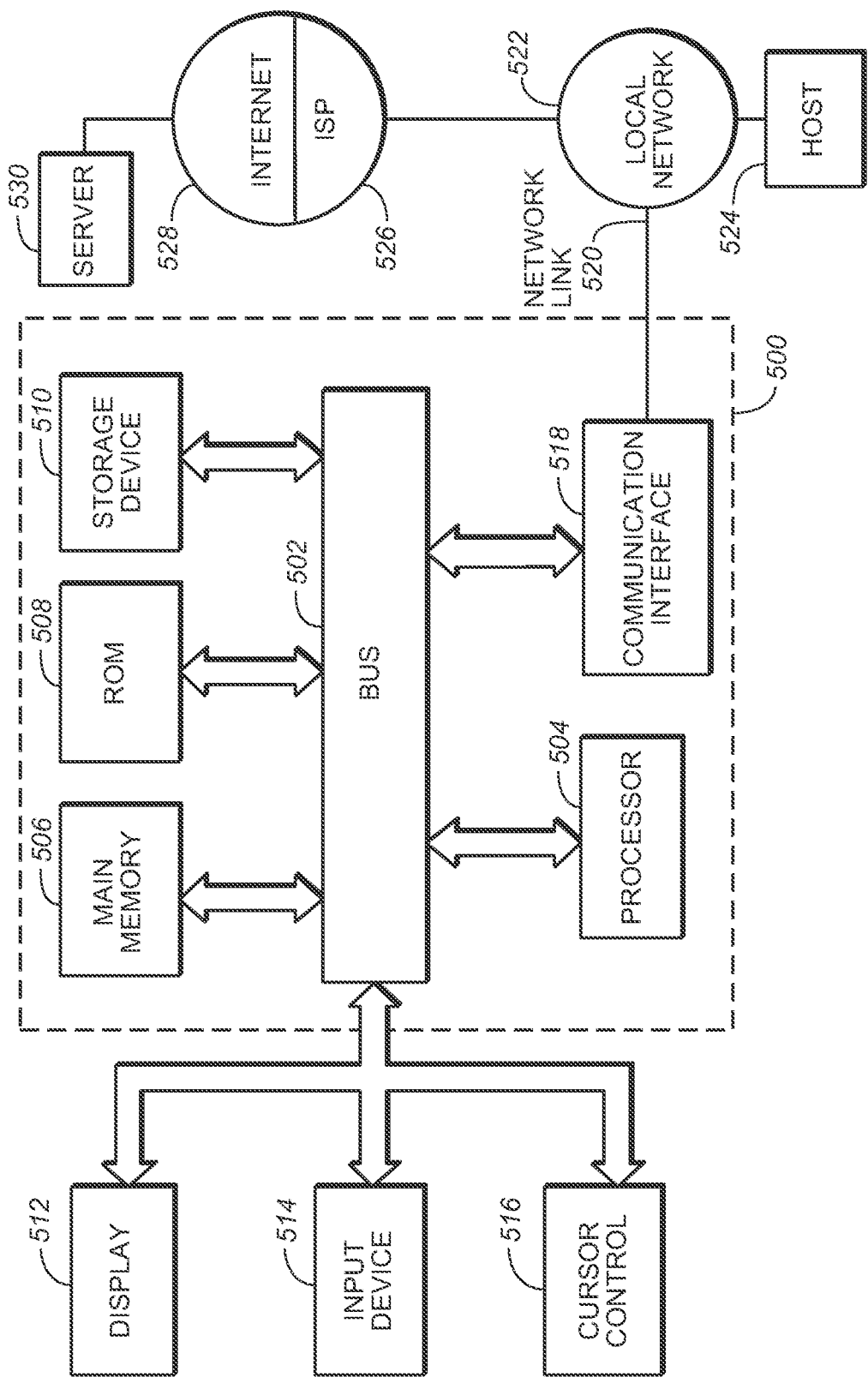

For example, FIG. 5 is a block diagram that illustrates a computer system 500 according to an embodiment of the invention. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is configured to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512.

Computer system 500 implements the techniques described herein using customized hard-wired logic, one or more ASICs or FPGAs, firmware and/or program logic which in combination with the computer system causes or programs computer system 500 to be a special-purpose machine. The techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

8. IMPLEMENTATION SCENARIOS—EXAMPLE SYSTEM OVERVIEW

In various embodiments, the techniques described herein are implemented by one or more special-purpose computing devices. In at least one embodiment, one or more such special-purpose computing devices may be connected together and/or to other computing devices to form, for example, a teleconference system.

Figure 6:
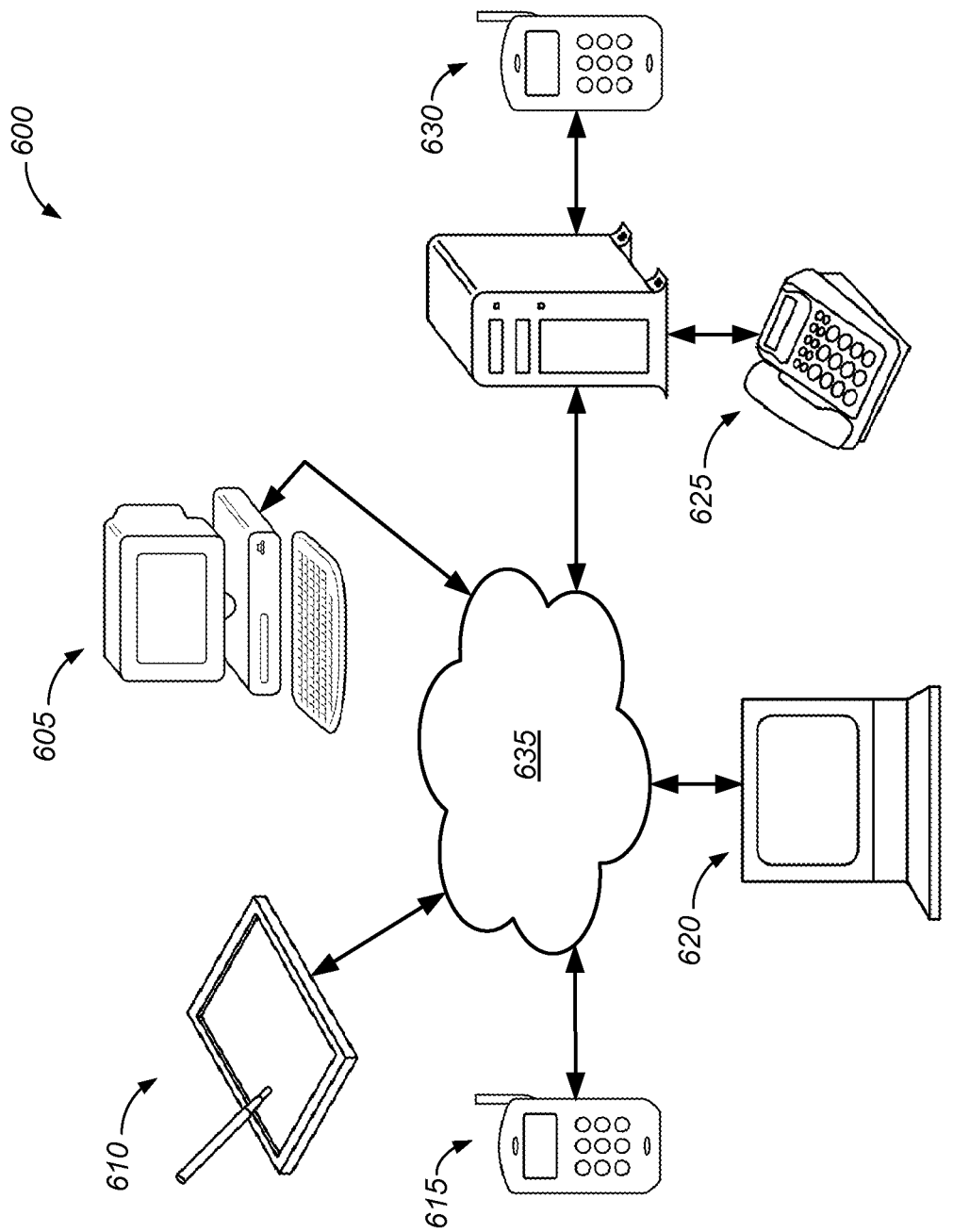
FIG. 6 schematically shows a teleconference system, in accordance with embodiments of the present disclosure, which comprises one or more instances of the computer system of FIG. 5.

As shown in FIG. 6, a teleconference system 600 according to at least one embodiment comprises a plurality of telephone endpoints 605, 610, 615, 620, 625, 630 connected to each other via a network 635.

The plurality of telephone endpoints 605, 610, 615, 620, 625, 630 comprises one or more special-purpose computing devices 605, 610, 615, 620 configured to implement the techniques described herein, as well as, optionally, a conventional telephone 625 and a conventional mobile telephone 630. Other suitable telephone endpoints, which fall within the scope of the accompanying claims, will be readily appreciated by those skilled in the art.

The network 635 may be an Internet Protocol (IP) based network comprising the Internet. Communications between the telephone endpoints 605, 610, 615, 620, 625, 630 may comprise IP based communications. Telephone endpoints such as the conventional telephone 625 and the conventional mobile telephone 630 may connect to the network 635 via conventional connections, such as a plain old telephone service (POTS) connection, an Integrated Services Digital Network (ISDN) connection, a cellular network collection, or the like, in a conventional manner (well known in VoIP communications).

9. EQUIVALENTS, EXTENSIONS, ALTERNATIVES AND MISCELLANEOUS

Even though the present disclosure describes and depicts specific example embodiments, the invention is not restricted to these specific examples. Modifications and variations to the above example embodiments can be made without departing from the scope of the invention, which is defined by the accompanying claims only.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs appearing in the claims are not to be understood as limiting their scope.

Note that, although separate embodiments, architectures and implementations are discussed herein, any suitable combination of them (or of parts of them) may form further embodiments, architectures and implementations.

What is claimed is:

1. Apparatus for processing audio or video data, the apparatus comprising:
   an input for receiving audio or video data;
   a first transform module configured to generate first transform-domain audio or video data by at least applying a first transform to the audio or video data;
   a first signal processing module connected to the first transform module and configured to generate processed first transform-domain audio or video data by at least applying first signal processing to the first transform-domain audio or video data;
   a second transform module configured to generate second transform-domain audio or video data by at least applying a second transform to a selected one of the audio or video data and the processed first transform-domain audio or video data, the second transform being different from the first transform;
   a second signal processing module selectively connected to the second transform module and configured to generate processed second transform-domain audio or video data by at least applying second signal processing to the second transform-domain audio or video data;
   an analysis module configured to analyze at least one of the audio or video data, the first transform-domain audio or video data, the processed first transform-domain audio or video data, the second transform-domain audio or video data or the processed second transform-domain audio or video data, and to determine at least in part therefrom whether to apply the first signal processing or the second signal processing, wherein the analysis module determines whether to apply the first signal processing or the second signal processing based on at least one of a latency criterion, a complexity criterion, and a band separation criterion; and
   a path selection module configured to,
   in response to the analysis module determining to apply the first signal processing, selectively channel the audio or video data along a first path from the input through the first transform module and the first signal processing module, thereby producing the processed first transform-domain audio or video data, and send the processed first transform-domain audio or video data to a third signal processing module without applying any further transform, and
   in response to the analysis module determining to apply the second signal processing, selectively channel the audio or video data along a second path from the input through the second transform module and the second signal processing module, thereby producing the processed second transform-domain audio or video data, and send the processed second transform-domain audio or video data to the third signal processing module without applying any further transform.

2. The apparatus as recited in claim 1, wherein:
   the first transform is matched to the first signal processing; and
   the second transform is matched to subsequent processing, at least a part of said subsequent processing being performed by the third signal processing module.

3. The apparatus as recited in claim 1, wherein:
   the determining to apply the second signal processing comprises determining that a signal to noise ratio of the time-domain audio or video data, of the first transform-domain audio or video data, of the processed first transform-domain audio or video data, of the second transform-domain audio or video data or of the processed second transform-domain audio or video data is below a predetermined threshold.

4. The apparatus as recited in claim 1, wherein the first transform comprises one of: a modulated complex lapped transform, a modified discrete sine transform, a quadrature mirror filter-bank transform, a DCT-I, II or IV transform or a variant or approximation of a Karhunen-Loève transform.

5. The apparatus as recited in claim 1, wherein the second transform comprises one of: a modified discrete cosine transform, a modified discrete Fourier transform, a complex quadrature mirror filter-bank transform, or a discrete Fourier transform.

6. The apparatus as recited in claim 1, wherein the second signal processing comprises at least one of: echo cancellation processing, noise estimation or suppression, or multi-band dynamic range control or equalization.

7. The apparatus as recited in claim 1, wherein the first signal processing comprises at least one of: echo cancellation, or complex-valued frequency domain convolution or filtering.

8. The apparatus as recited in claim 1, wherein said third signal processing module is configured to perform third signal processing, the third signal processing comprising data compression.

9. Apparatus for processing audio or video data, the apparatus comprising:
   an input for receiving time-domain audio or video data;
   a first transform module configured to generate first transform-domain audio or video data by at least applying a first transform to the time-domain audio or video data;

a first signal processing module configured to generate first processed transform-domain audio or video data by at least applying first signal processing to the first transform-domain audio or video data;

a conversion module configured to convert the first transform-domain audio or video data directly into second transform-domain audio or video data, the second transform-domain audio or video data being equivalent to data generated by applying a second transform to the audio or video data, the second transform being different from the first transform;

a second signal processing module connected to the conversion module and configured to generate processed second transform-domain audio or video data by at least applying second signal processing to the second transform-domain audio or video data;

an analysis module configured to analyze at least one of the time-domain audio or video data, the first transform-domain audio or video data, the processed first transform-domain audio or video data, the second transform-domain audio or video data or the processed second transform-domain audio or video data, and to determine at least in part therefrom whether to apply the first signal processing or the second signal processing, wherein the analysis module determines whether to apply the first signal processing or the second signal processing based on at least one of a latency criterion, a complexity criterion, and a band separation criterion; and a path selection module configured to, in response to the analysis module determining to apply the first signal processing, selectively channel the time-domain audio or video data along a first path from the first transform module through the first signal processing module, thereby producing the first processed transform-domain audio or video data, and send the first processed transform-domain audio or video data to a third signal processing module without applying any further transform, and in response to the analysis module determining to apply the second signal processing, selectively channel the time-domain audio or video data along a second path from the first transform module through the conversion module and the second signal processing module, thereby producing the processed second transform-domain audio or video data, and send the processed second transform-domain audio or video data to the third signal processing module without applying any further transform.

10. The apparatus as recited in claim 9, wherein:
the first transform is matched to the first signal processing; and
the second transform is matched to subsequent processing, at least a part of said subsequent processing being performed by the third signal processing module.

11. The apparatus as recited in claim 9, wherein:
the determining to apply the second signal processing comprises determining that a signal to noise ratio of the time-domain audio or video data, of the first transform-domain audio or video data, of the processed first transform-domain audio or video data, of the second transform-domain audio or video data or of the processed second transform-domain audio or video data is below a predetermined threshold.

12. The apparatus as recited in claim 9, wherein the first transform comprises one of: a modulated complex lapped transform, a modified discrete sine transform, a quadrature mirror filter-bank transform, a DCT-I, II or IV transform or a variant or approximation of a Karhunen-Loève transform.

13. The apparatus as recited in claim 9, wherein the second transform comprises one of: a modified discrete cosine transform, a modified discrete Fourier transform, a complex quadrature mirror filter-bank transform, or a discrete Fourier transform.

14. The apparatus as recited in claim 9, wherein the second signal processing comprises at least one of: echo cancellation processing, noise estimation or suppression, or multi-band dynamic range control or equalization.

15. The apparatus as recited in claim 9, wherein the first signal processing comprises at least one of: echo cancellation, or complex-valued frequency domain convolution or filtering.

16. The apparatus as recited in claim 9, wherein said third signal processing module is configured to perform third signal processing, the third signal processing comprising data compression.

17. Apparatus for processing audio or video data, the apparatus comprising:

an input for receiving first transform-domain audio or video data;

a first signal processing module configured to generate processed first transform-domain audio or video data by at least applying first signal processing to the first transform-domain audio or video data;

a first inverse transform module selectively connected to the first signal processing module and configured to generate audio or video data by at least applying a first inverse transform to the processed first transform-domain audio or video data, the first inverse transform being the inverse of a first transform;

a first transform module connected to the first inverse transform module and configured to generate second transform-domain audio or video data by at least applying a second transform to the audio or video data, the second transform being different from the first transform;

a second signal processing module connected to the first transform module and configured to generate processed second transform-domain audio or video data by at least applying second signal processing to the second transform-domain audio or video data;

a third signal processing module selectively connected to the first signal processing module and configured to generate twice processed first transform-domain audio or video data by at least applying third signal processing to the processed first transform-domain audio or video data;

an analysis module configured to analyze at least one of the first transform-domain audio or video data, the processed first transform-domain audio or video data, the audio or video data, the second transform-domain audio or video data or the processed second transform-domain audio or video data, and to determine at least in part therefrom whether to apply the second signal processing or the third signal processing; and a path selection module configured to, in response to the analysis module determining to apply the second signal processing, selectively channel the first transform-domain audio or video data along a first path from the input to the second signal processing module, thereby producing the processed first transform-domain audio or video data, and send the processed first transform-domain audio or video data to the first inverse transform module or a further inverse transform module configured to generate audio or video data by at least applying a first inverse transform to the first transform-domain audio or video data, and in response to the analysis module determining to apply the third signal processing, selectively channel the first transform-domain audio or video data along a second path from the input to the first signal processing module, thereby producing the processed first transform-domain audio or video data, and send the processed first transform-domain audio or video data to the third signal processing module.

18. The apparatus as recited in claim 17, wherein:
the second transform is selected for its suitability for the first signal processing.

19. Apparatus for processing audio or video data, the apparatus comprising:
an input for receiving first transform-domain audio or video data;
a first signal processing module configured to generate processed first transform-domain audio or video data by at least applying first signal processing to the first transform-domain audio or video data;
a conversion module configured to convert the first transform-domain audio or video data directly into second transform-domain audio or video data;
a second signal processing module connected to the conversion module and configured to generate processed second transform-domain audio or video data by at least applying second signal processing to the second transform-domain audio or video data;
an analysis module configured to analyze at least one of the first transform-domain audio or video data, the processed first transform-domain audio or video data, the second transform-domain audio or video data or the processed second transform-domain audio or video data, and to determine at least in part therefrom whether to apply the first signal processing or the second signal processing; and
a path selection module configured to,
in response to the analysis module determining to apply the first signal processing, selectively channel the first transform-domain audio or video data along a first path from the input to the first signal processing module, thereby producing the processed first transform-domain audio or video data, and send the processed first transform-domain audio or video data to an inverse transform module configured to generate audio or video data by at least applying a first inverse transform to the first transform-domain audio or video data, and
in response to the analysis module determining to apply the second signal processing, selectively channel the first transform-domain audio or video data along a second path from the input to the conversion module and the second signal processing module, thereby producing the processed second transform-domain audio or video data.

20. The apparatus as recited in claim 19, wherein:
the second transform is selected for its suitability for the first signal processing.

21. The apparatus as recited in claim 1, wherein the latency criterion relates to a delay introduced by a given transform and an inverse of the given transform.

22. The apparatus as recited in claim 21, wherein the delay comprises a first time to accumulate a plurality of input samples and a second time to reconstruct a signal from the plurality of samples.

23. The apparatus as recited in claim 1, wherein the latency criterion relates to an acceptable latency that is compared with a current indication of signal depth from at least one module.

24. The apparatus as recited in claim 1, wherein the complexity criterion relates to one or more of a number of required operations, a number of multiplications per input sample, and a memory requirement for storing intermediate variables.

25. The apparatus as recited in claim 1, wherein the complexity criterion relates to an indication of processor availability.

26. The apparatus as recited in claim 1, wherein the band separation criterion relates to an extent to which each frequency band in a given transform domain is independent from each other frequency band in the given transform domain.

27. The apparatus as recited in claim 17, wherein the first transform comprises one of: a modulated complex lapped transform, a modified discrete sine transform, a quadrature mirror filter-bank transform, a DCT-I, II or IV transform or a variant or approximation of a Karhunen-Loève transform.

28. The apparatus as recited in claim 17, wherein the second transform comprises one of: a modified discrete cosine transform, a modified discrete Fourier transform, a complex quadrature mirror filter-bank transform, or a discrete Fourier transform.

29. The apparatus as recited in claim 17, wherein the second signal processing comprises at least one of: echo cancellation processing, noise estimation or suppression, or multi-band dynamic range control or equalization.

30. The apparatus as recited in claim 17, wherein the first signal processing comprises at least one of: echo cancellation, or complex-valued frequency domain convolution or filtering.

31. The apparatus as recited in claim 17, wherein said third signal processing module is configured to perform third signal processing, the third signal processing comprising data compression.

32. The apparatus as recited in claim 19, wherein the first transform comprises one of: a modulated complex lapped transform, a modified discrete sine transform, a quadrature mirror filter-bank transform, a DCT-I, II or IV transform or a variant or approximation of a Karhunen-Loève transform.

33. The apparatus as recited in claim 19, wherein the second transform comprises one of: a modified discrete cosine transform, a modified discrete Fourier transform, a complex quadrature mirror filter-bank transform, or a discrete Fourier transform.

34. The apparatus as recited in claim 19, wherein the second signal processing comprises at least one of: echo cancellation processing, noise estimation or suppression, or multi-band dynamic range control or equalization.

35. The apparatus as recited in claim 19, wherein the first signal processing comprises at least one of: echo cancellation, or complex-valued frequency domain convolution or filtering.

36. The apparatus as recited in claim 19, wherein said third signal processing module is configured to perform third signal processing, the third signal processing comprising data compression.

* * * * *